United States Patent

Aquarius et al.

[11] Patent Number: 5,873,215
[45] Date of Patent: Feb. 23, 1999

[54] MACHINE AND METHOD FOR MANUFACTURING PNEUMATICALLY FILLED PACKING CUSHIONS

[75] Inventors: Pieter Theodorus Joseph Aquarius, Stramproy; Rogier Pierre Theodorus Weekers, Leende, both of Netherlands

[73] Assignee: Free-Flow Packaging International, Inc., Redwood City, Calif.

[21] Appl. No.: 905,692

[22] Filed: Aug. 4, 1997

[30] Foreign Application Priority Data

Oct. 18, 1996 [NL] Netherlands ............................ 1004307

[51] Int. Cl.⁶ ........................................................ B65B 31/00
[52] U.S. Cl. .................................. 53/403; 53/432; 53/512
[58] Field of Search ................................. 53/403, 79, 512, 53/432; 156/145, 147; 141/329

[56] References Cited

U.S. PATENT DOCUMENTS

| | | | |
|---|---|---|---|
| 2,761,264 | 9/1956 | Gossett . | |
| 3,575,757 | 4/1971 | Smith | 156/147 |
| 3,817,803 | 6/1974 | Horsky | 156/145 |
| 3,900,356 | 8/1975 | Koch et al. | 156/145 |
| 4,017,351 | 4/1977 | Larson et al. | 156/147 |
| 4,112,124 | 9/1978 | Jarvis | 53/512 |
| 4,169,344 | 10/1979 | Ganz et al. | 156/145 |
| 4,564,407 | 1/1986 | Tsuruta . | |
| 4,894,265 | 1/1990 | Chang et al. . | |
| 5,216,868 | 6/1993 | Cooper et al. | 53/79 |
| 5,581,983 | 12/1996 | Murakami | 53/512 |
| 5,660,662 | 8/1997 | Testone | 156/145 |
| 5,693,163 | 12/1997 | Hoover et al. | 156/147 |

FOREIGN PATENT DOCUMENTS

| | | |
|---|---|---|
| WO 8603163 | 6/1986 | WIPO . |
| WO 9407678 | 4/1994 | WIPO . |
| WO 9626137 | 8/1996 | WIPO . |

*Primary Examiner*—James F. Coan
*Assistant Examiner*—Gene L. Kim
*Attorney, Agent, or Firm*—Flehr Hohbach Test Albritton & Herbert LLP

[57] ABSTRACT

Machine and method for manufacturing pneumatically filled packing cushions. A length of flattened flexible tubing is fed through a machine and perforated to form a row of openings across the tubing. Gas is injected into the tubing through the openings, and the tubing is then sealed together across the openings form a chamber in which the gas is confined.

22 Claims, 4 Drawing Sheets

MACHINE AND METHOD FOR MANUFACTURING PNEUMATICALLY FILLED PACKING CUSHIONS

This application corresponds to Dutch Patent Application No. 1004307, filed Oct. 18, 1996, the priority of which is claimed.

This invention pertains generally to packing materials and, more particularly, to a machine and method for manufacturing pneumatically filled packing cushions.

International application WO94/07678 discloses apparatus for making small cushions or pillows which are filled with air for use as a protective filling material in packing fragile items and other objects in shipping cartons and the like. The cushions are made by forming a seal across the tubing, injecting air into the tubing through a needle which pierces the wall of the tubing, and then forming another seal across the tubing where the air was injected to close the cushion and seal the hole made by the needle. Successive cushions come out of the machine joined together, and they can either be left together and used in groups, or they can be separated and used individually.

In practice, it has been found that this system has certain limitations and disadvantages, and many of the cushions are not adequately filled with air. With the flexible tubing, it is difficult to insert the needle through the wall without pricking the material a second time, and when that happens, air escapes through the second hole before the holes are sealed. If the second hole is outside the area which is sealed, the air will continue to escape even after the cushion is sealed.

U.S. Pat. No. 5,340,632 discloses a system in which an air filled padding element is formed by sealing two sheets of plastic film together in longitudinal and transverse directions to form a matrix of chambers, injecting air into the chambers through tubes which extend longitudinally between the sheets, and cutting the sheets longitudinally between the chambers to permit contouring of the element about an object.

It is in general an object of the invention to provide a new and improved machine and method for the manufacture of pneumatically filled packing cushions.

Another object of the invention is to provide a machine and method of the above character which overcome the limitations and disadvantages of the prior art.

These and other objects are achieved in accordance with the invention by providing a machine and method for manufacturing pneumatically filled packing cushions from a length of flattened flexible tubing by perforating the tubing to form a row of openings across the tubing, injecting a gas into the tubing through the openings, and sealing the tubing together across the openings form a chamber in which the gas is confined.

Figure 1:
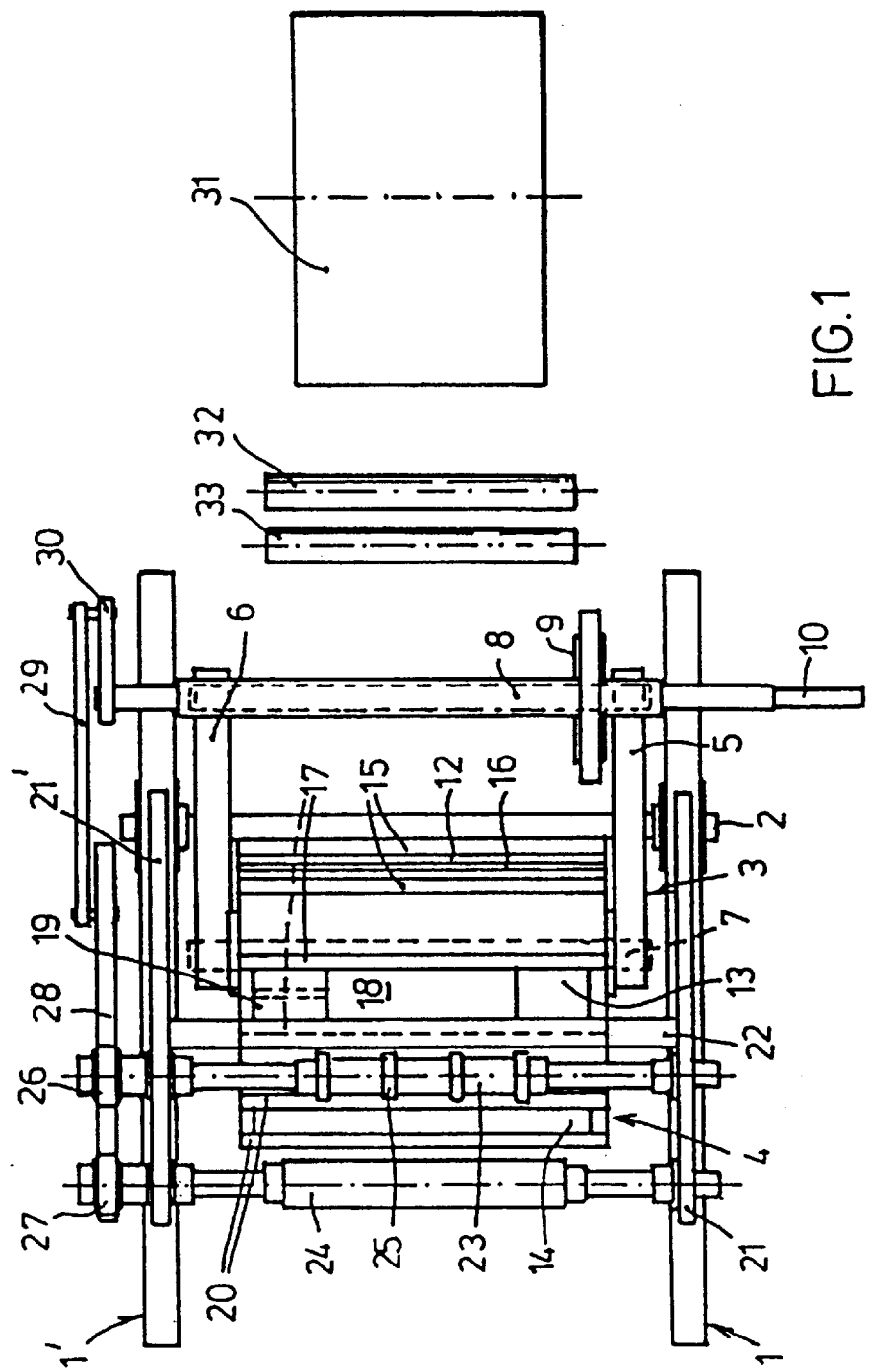
FIG. 1 is a top plan view, somewhat schematic, of a portion of one embodiment of a machine for manufacturing pneumatically filled packing cushions according to the invention.
Figure 2:
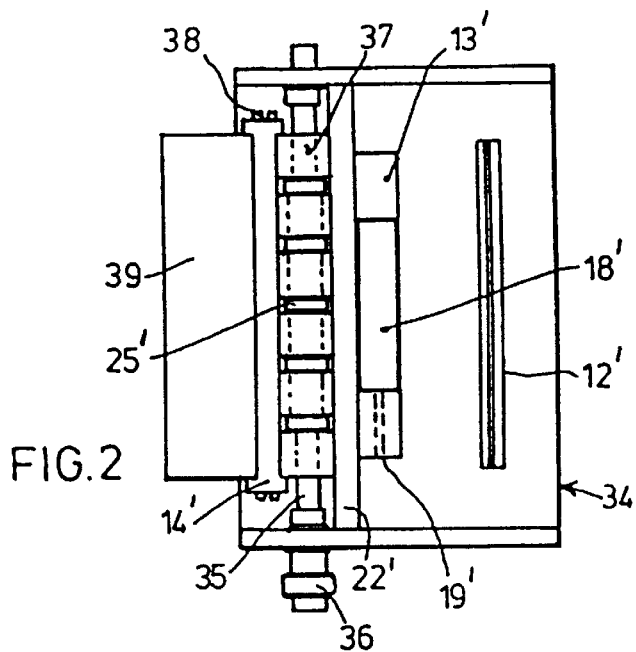
FIG. 2 is a bottom plan view, somewhat schematic, of another portion of the embodiment of FIG. 1.

The cushions are made from a flexible, heat sealable plastic tubing such as high density polyethylene which has been flattened and wound onto a supply roll 31. A continuous length or web 40 of the tubing is fed from the supply roll along a generally horizontal path through the machine between a stationary head 34 and a movable head 4 which carry interactive means for perforating the tubing, injecting air or another pressurized gas into the tubing, and sealing the tubing together along the perforations to complete the cushions.

The machine has a frame with side members 1, 1' on which the two cushion forming heads are mounted, with the stationary head 34 in an inverted position above the movable head 4.

The movable head is mounted on a pair of rocker arms 5, 6 which pivot on a shaft 2 that extends between the side members of the frame. Shafts 7, 8 extend between the end portions of the arms, with the head being pivotally mounted on shaft 7 toward the rear of the arms. The head is constrained for motion in a direction perpendicular to the stationary head by suitable means such a link (not shown) which is pivotally connected between the head and the frame parallel to the rocker arms.

A drive shaft 10 is rotatively mounted on the frame above shaft 8 toward the front of the rocker arms. A cam 11 mounted on the drive shaft engages a cam follower 9 on shaft 8 to rock the arms and, hence, the moving head up and down as the drive shaft rotates. the drive shaft is driven by suitable means such as an electric motor (not shown).

Means for perforating the plastic tubing is provided at a perforating station located toward the front of the heads, i.e. the side facing the supply roll 31 from which the tubing is fed to the machine. This means includes a blade 16 which is affixed to the base 4a of the moving head and extends in an upward direction across and below the path of the tubing. The blade has a plurality of upwardly facing teeth 16a for punching a transversely extending row of perforations or openings in the tubing. The teeth preferably have at least three cutting edges, most preferably four, and are spaced apart by a distance less than the width of the teeth. As discussed more fully hereinafter, compressed air or other gas is injected into the tubing through the openings, and it is preferable that those openings be relatively large so that a cushion can be filled with air in a relatively short time.

A pair of jaws 12, 12' is provided on each side of the blade for holding the tubing in a fixed position as it is punched. Jaws 12 are retractably mounted on movable head 4, and jaws 12' are mounted in a fixed position on stationary head 34 opposite jaws 12. Jaws 12 are mounted on springs 12a between a pair of upright guides 15 affixed to the base 4a of the head for movement between extended and retracted positions relative to the blade and to jaws 12'. The springs urge jaws 12 toward the extended position in which they cover the blade.

An injection station is provided toward the center of the heads for introducing air or other suitable gas into the tubing through the openings which are formed at the perforating station. This means includes a pair of plenum blocks 13, 13' which are mounted on the heads and positioned in registration with each other on opposite sides of the tubing path. These blocks have open chambers or wells 18, 18' which face each other and encompass the row of openings in the tubing. Passageways 19, 19' are formed in the blocks for delivering air or other gas under pressure to the chambers.

Block 13' is mounted in a fixed position on stationary head 34, and block 13 is mounted on springs 13a between a pair of upright guides 17 affixed to the base 4a of the movable head for movement between extended and retracted positions relative to block 13'. The springs urge block 13 toward its extended position.

A floating platen 41 is positioned inside the tubing at the injection station for holding the walls of the tubing apart and directing the air injected through the openings in the tubing walls in a downstream direction toward the sealing station. The platen has major surfaces 41*a* which face the walls of the tubing, and cavities 42 which extend between the major surfaces in registration with the chambers 18, 18' in plenum blocks 13, 13'. Air passageways 43 extend between the cavities and the downstream edge of the platen. These passageways are distributed over almost the entire width of the tubing in order to feed the air into the tubing quickly and quietly.

The platen floats between and is retained in position by the jaws 12, 12' of the perforating station and a pair of retaining bars 22, 22' which extend between mounts 21, 21' on the side members of the frame on opposite sides of the tubing path on the downstream side of the injection station. The retaining bars are spaced apart by a distance less than the thickness of the platen but great enough to permit the tubing to pass freely between them. The edges of the platen are bevelled, and the surfaces are smoothened to insure that the tubing will pass freely over the platen without catching on it or tearing. A support plate 41*b* is positioned beneath the platen to support it at times when the tubing is not taut.

A sealing station is provided toward the downstream side of the heads for sealing the walls of the tubing together across the openings after the air is injected. This means includes a pair of heat sealing bars 14, 14' which are mounted on the heads and positioned in registration with each other on opposite sides of the tubing path.

Sealing bar 14' is mounted in a fixed position on stationary head 34, and is heated by a source of electrical power (not shown) through connectors 38.

Bar 14 is mounted on springs 14*a* between a pair of upright guides 20 affixed to the base 4*a* of the movable head for movement between extended and retracted positions relative to bar 14'. The springs urge bar 14 toward its extended position.

A plurality of transport rollers are provided for feeding the tubing between the cushion forming heads and keeping it taut in the process. In this regard, rollers 32, 33 are positioned between supply roll 31 and the cushion forming heads, rollers 23, 35 are positioned between the injection and sealing stations, and a roller 24 is positioned downstream of the heads. Rollers 23, 24 are carried by mounts 21, 21' and are positioned beneath the path of the tubing, and roller 35 is positioned above roller 23 on the upper side of the path. Rollers 23, 35 pull the tubing past the perforating and injection stations and help to keep it taut at those stations. Roller 24 pulls the tubing through the sealing station and keeps it taut at that station. To further insure tautness, travel of the tubing on the upstream or supply side of the heads can be restricted, e.g. by a brake on supply roll 31 or by other suitable frictional means for resisting movement of the tubing toward the heads.

Drive rings or tires 25, 25' are included on rollers 23, 35 for frictional engagement with the tubing. These tires are spaced apart and interspersed along the rollers, with spaces between the tires through which the air in the tubing can pass. In the embodiment illustrated, plates 37 are positioned between the tires 25' on roller 35 and are engaged by the tires 25 on roller 23. Corresponding plates (not shown) are positioned between the tires 25 on roller 23 and are engaged by the tires 25' on roller 35. Alternatively, the plates can be omitted, and the tires on each roller can bear against the body of the other roller between the tires on it.

An adjustable plate 39 is mounted on stationary sealing bar 14' for controlling the amount of air entering the cushions and, hence, the size and firmness of the cushions. This plate is spaced above drive roller 24, and the cushions are filled with air in the space between the plate and the roller. It is pivotally attached to the sealing bar to permit adjustment of the spacing between the plate and the roller.

Rollers 23, 24 are driven in the forward direction by a rack gear 28 which engages drive gears 26, 27 on the shafts of the rollers. The rack gear is driven by a crank 30 which is affixed to drive shaft 10 and connected to the rack gear by a link 29. During the return stroke of the rack gear, it is disengaged from drive gears 26, 27 so that rollers 23, 24 are driven in the forward direction only. Roller 35 is driven by a gear 36 which is mounted on the shaft of that roller and driven by the drive gear 26 for roller 23.

Timing of the feed roller and head movement is controlled by the profile of cam 11, with the machine going through one complete operating cycle for each revolution of the cam. During the first half of the cycle, the tubing is advanced from station to station, with the heads stationary, and during the second half of the cycle, the tubing is stationary and the perforating, injection and sealing means carried by the heads are actuated. The heel 11*a* of the cam is circular and extends through an arc length of 180°, and when cam follower 9 is in contact with that portion of the cam, movable head 4 remains in its retracted position. The lobe 11*b* of the cam has a profile which depresses the follower to advance the head and sequentially actuate the means for perforating the tubing, injecting the air, and sealing the tubing during the second half of the cycle.

Operation and use of the machine, and therein the method of the invention, are as follows. With the heads separated, length or web 40 of flattened tubing from supply roll 31 is passed over rollers 32, 33 and fed between jaws 12, 12' in the perforating station. Platen 41 is then inserted into the tubing, and the end portion of the tubing is threaded between plenum blocks 18, 18' and between retaining bars 22, 22' to feed rollers 23, 35.

When drive shaft 10 turns, cam 11 rotates and so does crank 30. During the first half of the operating cycle, rack gear 28 is in engagement with drive gears 26, 27, and rollers 23, 35 advance the tubing in the forward direction by an amount equal to the distance between the stations. Thus, during successive cycles, a given portion of the tubing is aligned first with the perforator, then with the injector blocks, and then with the sealing bar.

Figure 3:
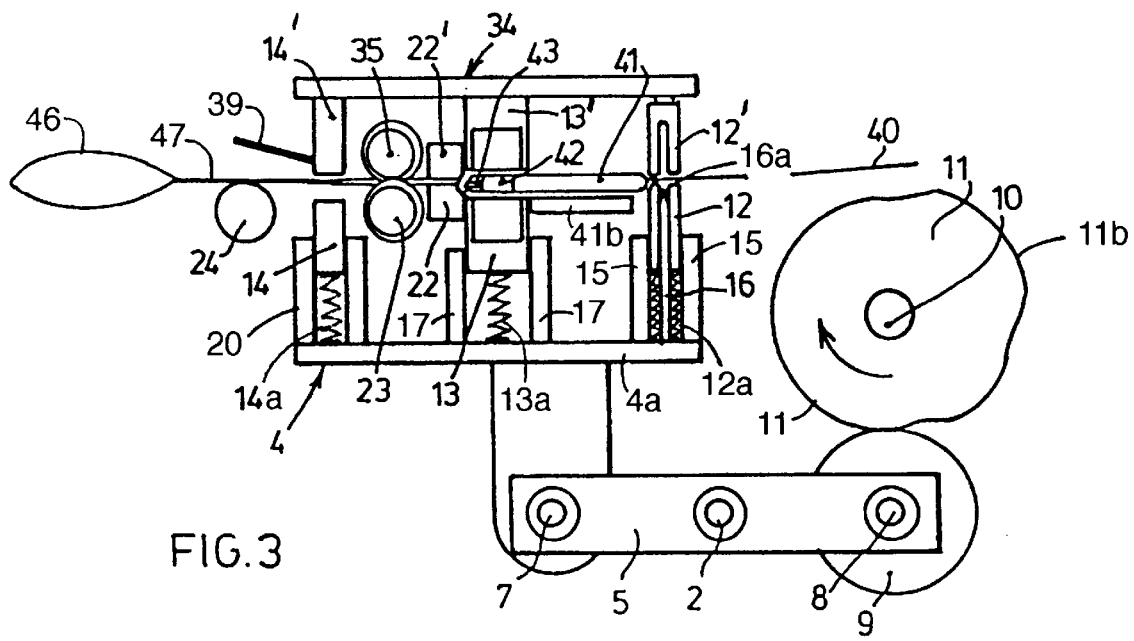
FIGS. 3–5 are vertical sectional views, again somewhat schematic, illustrating operation of the embodiment of FIG. 1.

FIG. 3 illustrates the machine as it approaches the end of the transport phase of the cycle. Cam follower 9 is resting on the heel of the cam, and movable head 4 is in its retracted or down position, with jaws 12, 12' separated from each other, plenum blocks 13, 13' separated from platen 41, and sealing bars 14, 14' separated from each other. The perforations formed during the previous cycle are approaching the injection station, and the ones formed during the cycle before that are approaching the sealing station. Two sections 46, 47 of tubing are illustrated as having advanced beyond the heads, with section 46 having been filled with air and sealed to form a cushion, and section 47 resting on feed roller 24, ready to be filled.

Figure 4:
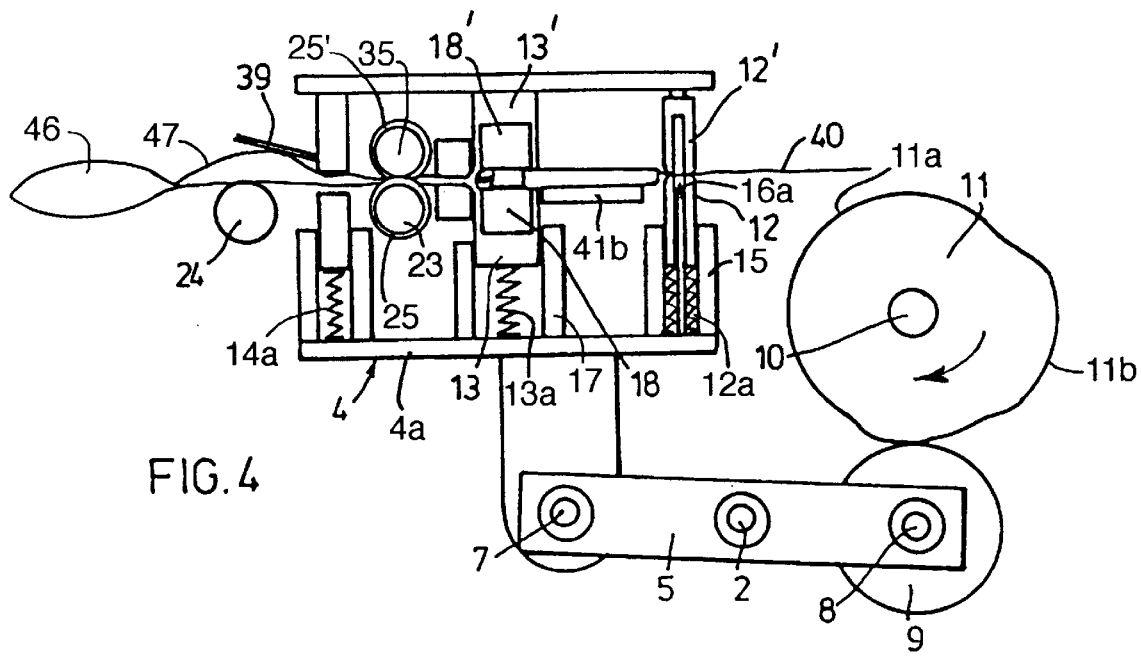

The transport phase ends when rack gear 28 reaches the forward end of its travel and the perforations reach the stations they are approaching. At that point, the rack gear is disengaged from drive gears 26, 27, and begins its rearward travel. Cam follower 9 is depressed by the cam lobe, and the moving head advances toward the stationary head. FIG. 4 shows the machine shortly after the cushion making phase of the cycle begins.

As the head advances, jaws 12 abut against jaws 12', clamping the tubing between them. As the head continues to advance, springs 12a are compressed, and hold the jaws tightly against the tubing.

The advancing movement of the head also brings the faces of plenum blocks 13, 13' into engagement with the outer surfaces of the tubing, with the openings in the tubing aligned with chambers 18, 18'. Springs 13a are also compressed as the head continues to advance, thereby pressing the blocks tightly against the platen 41 inside the tubing and forming a seal between the blocks and the tubing.

At this point in the travel of the head, sealing bars 14, 14' are still separated, and pressurized air is introduced into plenum chambers 18, 18' through passageways 19, 19'. From those chambers, the air passes through the openings in the tubing walls and into the cavities 42 in the platen. The air then passes through passageways 43 and is thus directed in a forward direction toward the sealing station.

The air passes through the section of tubing between injection and sealing stations, between the tires 25, 25' on rollers 23, 35 and into the chamber within section 47 which is positioned above roller 24. The amount of air entering the chamber is controlled by the spacing between plate 39 and roller 24, with any excess air being vented through the row of holes aligned with the spaced apart sealing bars. While the air is being introduced, jaws 12, 12' are still clamped together, sealing off that portion of the tubing and preventing air from escaping upstream through the tubing.

Figure 5:
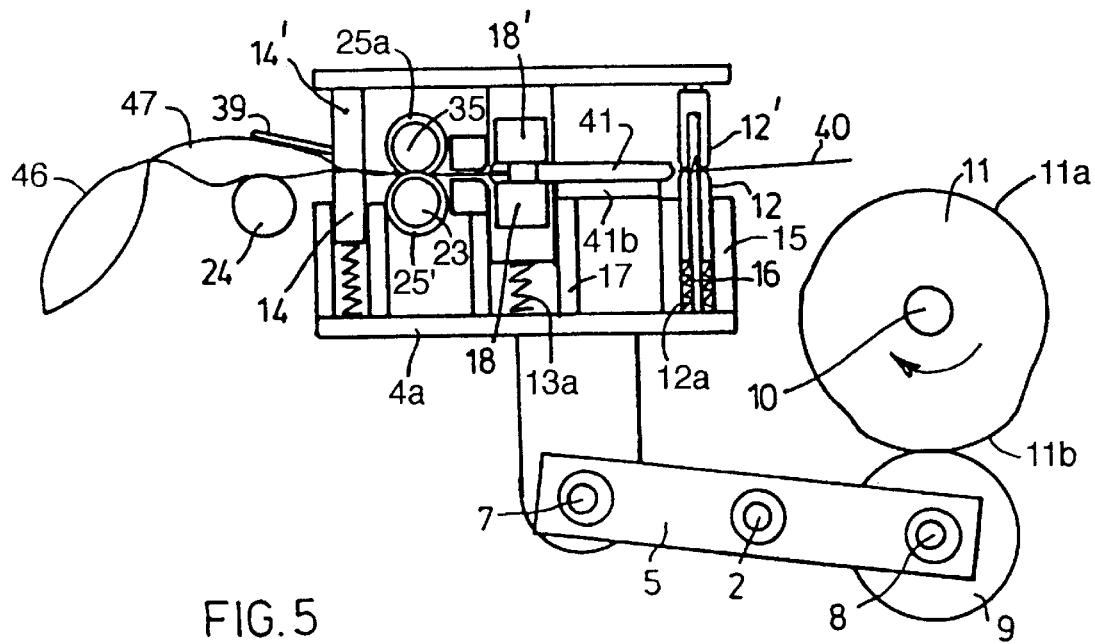
Figure 6:
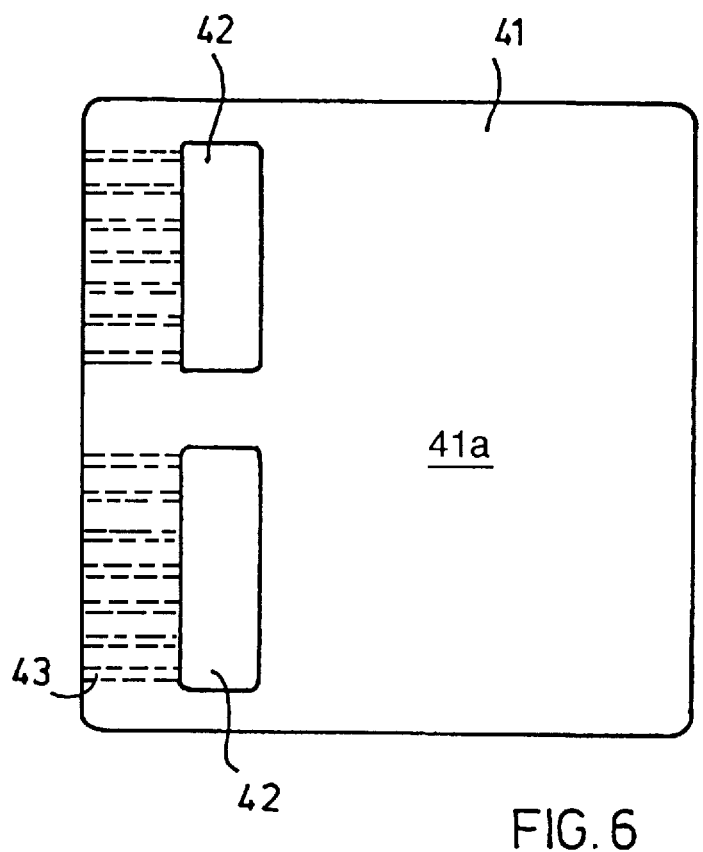
FIG. 6 is a top plan view of the floating platen in the embodiment of FIG. 1.

As the head approaches the highest point in its travel, the air supply is turned off, and sealing bar 14 abuts against sealing bar 14', with springs 14a urging the lower bar against the upper one. FIG. 5 shows the machine in this phase of its operation. Sealing bar 14' is then energized to fuse the two layers together along the row of perforations between the bars. This closes off the back side of the chamber, thereby sealing the chamber and confining the air in it, which completes the manufacture of the cushion in that section.

While the cushion in section 47 is being sealed, knife blade 16 continues to advance, with jaws 12, 12' clamped against the tubing, and the teeth on the blade are driven through both layers of the tubing wall to form a row of perforations or openings across the tubing at the perforating station. During the transport phase of the next cycle, that row of perforations moves to the injection station, and air is injected through them during the second half of that cycle.

In addition to providing the openings through which air is injected into the tubing, the rows of perforations between the sections of tubing provide means by which the cushions can be torn apart, either individually or in groups.

Once the nose of the cam lobe has travelled past the follower, head 4 begins to retract, and the sealing bars, plenum blocks and perforating jaws once again move apart in preparation for the next transport phase.

If desired, suction cups can be utilized instead of the platen for holding the walls of the tubing apart while the air is being injected. The cups are located outside the tubing, with one cup above and one below. Without the platen, the injected air will not be directed downstream as effectively as it is with the platen, but the clamping action of the jaws at the perforating station will still prevent the air from flowing upstream within the tubing.

The invention has a number of important features and advantages. The cushions are manufactured in a small number of steps, with good accuracy and at a relatively fast rate. The rows of perforations between the cushions permit the cushions to be torn apart by hand without the need for cutting tools. The machine is compact, and the tubing can be fed through it in a horizontal direction. It requires only a single drive system for feeding the tubing and performing the other operations on it since the feed roller and the head actuating mechanism are all driven off the same drive shaft. The perforations are relatively large and extend across almost the entire width of the tubing, which enables the cushions to be filled in a relatively short time. The floating platen enables the air to be directed downstream within the tubing, and having the air passageways extending at right angles to the cavities has been found to make the introduction of pressurized air into the cushions particularly quiet.

It is apparent from the foregoing that a new and improved machine and method for manufacturing pneumatically filled packing cushions has been provided. While only certain presently preferred embodiments have been described in detail, as will be apparent to those familiar with the art, certain changes and modifications can be made without departing from the scope of the invention as defined by the following claims.

We claim:

1. In a machine for manufacturing pneumatically filled packing cushions: means for feeding a length of flattened flexible tubing along a path, means for perforating the tubing to form a row of openings through opposing walls of the tubing at a first station along the path, means exteriorly engagable with the tubing at a second station for injecting a gas into the tubing through the openings, and means for sealing the tubing together along a transversely extending line at a third station to close the openings and form a chamber in which the gas is confined.

2. The machine of claim 1 wherein the stations are spaced equally apart along the path, and the means for feeding the tubing includes means for advancing the tubing from station to station in discrete steps.

3. The machine of claim 1 wherein the means for perforating the tubing includes a blade having a plurality of teeth for punching the openings in the tubing, and jaws positioned on opposite sides of the blade for engagement with the tubing to hold the tubing taut while the openings are being punched.

4. The machine of claim 1 wherein the means for injecting the gas includes a pair of plenum blocks which have open chambers which face the tubing and encompass the openings, and means for delivering pressurized gas to the chambers in the blocks.

5. The machine of claim 1 wherein the means for injecting the gas includes a platen which floats inside the tubing for holding the walls of the tubing apart and directing the gas from the openings to the chamber.

6. The machine of claim 5 wherein the platen has a pair of major surfaces, a cavity which extends through the platen between the major surfaces and registers with the openings in the tubing walls, and a passageway which extends between the cavity and an edge of the platen.

7. The machine of claim 1 including means exteriorly engagable with the tubing for limiting the amount of gas entering the chamber.

8. In a method of manufacturing pneumatically filled packing cushions, the steps of: feeding a length of flattened flexible tubing along a path, perforating the tubing to form a row of openings through two opposing walls of the tubing at a first station along the path, injecting a gas into the tubing through the openings in the two walls at a second station, and sealing the tubing together along a transversely extending line at a third station to close the openings and form a chamber in which the gas is confined.

9. The method of claim 8 wherein the stations are spaced equally apart along the path, and the tubing is advanced from station to station in discrete steps.

10. The method of claim 8 wherein the openings are formed by puncturing the tubing with a plurality of teeth carried by a blade, and engaging the tubing with jaws on opposite sides of the blade to hold the tubing taut.

11. The method of claim 8 wherein the gas is injected by exteriorly engaging the tubing with a pair of plenum blocks having open chambers which face the tubing and encompass the openings, and delivering pressurized gas to the chambers in the blocks.

12. The method of claim 8 including the steps of positioning a floating platen inside the tubing at the second station to hold the walls of the tubing apart, and directing the gas from the opening through the platen to the chamber.

13. The method of claim 12 wherein the platen has a pair of major surfaces which face the walls of the tubing, and the gas is injected through the openings in the tubing walls into a cavity which extends through the platen between the major surfaces, and then through a passageway which extends between the cavity and an edge of the platen.

14. The method of claim 8 including the step of exteriorly engaging the tubing to limit the amount of gas entering the chamber.

15. In a machine for manufacturing pneumatically filled packing cushions from a length of flattened flexible tubing:
   means for perforating the tubing to form a plurality of openings in successive lines across the tubing;
   a plenum block which is exteriorly engagable with the tubing and has an open chamber which faces the tubing and encompasses the successive lines of openings;
   a platen which floats inside the tubing and has a pair of major surfaces for holding the walls of the tubing apart, a cavity which extends through the platen between the major surfaces and registers with the successive lines openings in the tubing wall, and a plurality of passageways which extend between the cavity and an edge of the platen;
   means for injecting a gas into the tubing through the plenum block, the openings in the tubing, and the platen; and
   means for sealing the tubing together along the lines of openings to close the openings and form chambers between successive lines in which the gas is confined.

16. The machine of claim 15 including means for feeding the tubing from the perforating means to the plenum block and platen and thereafter to the sealing means.

17. In a machine for manufacturing pneumatically filled packing cushions from a length of flattened flexible tubing: a stationary head and a movable head aligned with each other on opposite sides of the tubing, means carried by the heads for perforating the tubing to form openings in a transverse row across the tubing, plenum blocks carried by the heads for engagement with the tubing, means for introducing gas into the tubing through the plenum blocks and the openings in the tubing, and means carried by the heads for sealing the tubing together along the row of openings to close the openings and form a chamber in which the gas is confined.

18. The machine of claim 17, including means for alternately advancing the tubing between the heads and moving the movable head toward the stationary head to perforate the tubing, engage the plenum blocks with the tubing, and seal the tubing.

19. The machine of claim 17, herein the means for perforating the tubing includes a blade having a plurality of teeth mounted in a fixed position on the movable head, a pair of stationary jaws mounted on the stationary head on opposite sides of the blade, and a pair of retractable jaws resiliently mounted on the movable head on opposite sides of the blade for yielding abutment against the stationary jaws upon movement of the movable head toward the stationary head.

20. The machine of claim 17, wherein one of the plenum blocks is mounted in a fixed position on the stationary head, and the other plenum block is resiliently mounted on the movable head for yielding abutment with the tubing upon movement of the movable head toward the stationary head.

21. The machine of claim 17, wherein the plenum blocks have open chambers which face each other and encompass the openings in the tubing.

22. The machine of claim 17, wherein the means for sealing the tubing comprises a first sealing bar mounted in a fixed position on the stationary head and a second sealing bar resiliently mounted on the movable head for yielding abutment against the first sealing bar upon movement of the movable head toward the stationary head.

* * * * *